United States Patent Office 2,969,286
Patented Jan. 24, 1961

2,969,286

METHOD OF PREPARING CHOCOLATE FLAVORING FOR ICE CREAM

L. Russell Cook, Milwaukee, Wis., assignor to Ambrosia Chocolate Company, Milwaukee, Wis., a corporation of Wisconsin No Drawing. Filed Mar. 30, 1959, Ser. No. 802,640

6 Claims. (Cl. 99—23)

This invention relates to food products and particularly to a fondantized chocolate flavoring composition for ice cream.

Whereas chocolate flavored ice cream has long enjoyed a very considerable and consistent popularity among a large segment of the consuming public, it is noteworthy that this acceptance is less than might be expected when compared with the demand for chocolate confections such as chocolate coated candies and solid chocolate bars. It is further notable that those persons who consume chocolate flavored ice cream very clearly prefer the type of product wherein the total cocoa bean content is present in considerably lower proportions than in chocolate candy that sells in comparatively large volume.

In considering the problem of the more ready acceptance by the consuming public of chocolate bars and like confections in comparison with the consumption of chocolate ice cream, it is significant that hitherto comparatively little effort has been directed toward improving the flavor of chocolate ice cream. Whereas it has been endeavored to make chocolate ice cream more visibly attractive, as by introducing the chocolate flavor in the form of bands or zones running through the body of the ice cream, or in the form of particles in the case of the familiar so-called chocolate chip ice cream, and although these expedients have been to a degree successful in promoting the popularity of chocolate ice cream, these improvements, of course, have negligible effect in flavor improvement.

It now has been found that if the chocolate flavoring ingredients used in the preparation of chocolate flavored ice cream are subjected to a preliminary controlled treatment as hereinafter set forth, that an ice cream flavoring agent can be produced which, when suitably incorporated in ice cream, imparts thereto a pronounced improved chocolate flavor. It has further been found that this improvement is quickly discerned and appreciated by consumers, and that they prefer chocolate ice cream made in accordance with this invention over chocolate ice creams hitherto known and available in the art.

It is an object of the present invention to produce an improved chocolate flavoring composition to be incorporated in ice cream or similar preparations.

It is a further object of the invention to produce an improved chocolate ice cream flavoring material having a reduced cocoa butter content.

With the above and other objects in view which will appear as the description proceeds, this invention resides in the novel product and method by which it is made, substantially as hereinafter described and more particularly defined by the appended claims, it being understood that such changes in the precise embodiments of the hereindisclosed invention may be made as come within the scope of the claims.

In accordance with the present invention, a mixture of sugar and chocolate liquor, prepared from beans which have been brought to only a low roast, is subjected to a conching operation. For this purpose, the cocoa beans, instead of being roasted to the customary extent, are roasted to so slight a degree as to amount substantially to a drying operation, this roasting being carried out to an extent not sufficient to harden the protein content but rather to preserve the proteins in an active form. After adding measured quantities of sugar, and, if desired, cocoa butter to the mixture of ingredients, it is desirable to reduce the mixture in particle size and work the same into a smooth paste by suitable grinding or passage over conventional refining rolls. Thereafter the mass is placed in a conche wherein it is subjected to agitation and aeration at such temperature and for such period of time as is sufficient to bring out the characteristic mellow, chocolate flavor and fondantized characteristics. The temperature preferably should be relatively high, and it is generally found desirable to carry out the conching operation at a temperature not substantially outside the range of 150° F. to 200° F., and usually within the range of about 175° F. to 190° F. A period of time from 18 to 24 hours under the aforesaid conditions has been found to yield good results.

The presence of sugar during the foregoing treatment is desirable for the reason that a chemical combination takes place between the amino-acids of the protein in the chocolate liquor and the sugar to form amino-sugars. The characteristic flavor develops progressively and depends, among other factors, upon the amount of the sugar present in the aforesaid mixture. Thus, even very small amounts of sugar such, for example, as one pound to 100 pounds chocolate liquor, will produce a slight degree of the desired characteristic, whereas a much greater development of flavor is achieved by the incorporation of larger proportions of sugar, which may run as high as 100 pounds sugar to each 100 pounds of chocolate liquor. In general, good results are obtained using an intermediate proportion of sugar, and no more sugar need be added than is consistent with economy. Ordinarily, the proportion of sugar to chocolate liquor should be not substantially greater than 40 parts by weight of sugar to 60 parts by weight of chocolate liquor, and not substantially less than 13 parts by weight of sugar to 87 parts by weight of chocolate liquor.

Following the aforesaid conching process, the product may be subjected to pressure in a hydraulic press to extract a modicum of cocoa butter therefrom, and thereafter it is crushed to a state of subdivision suitable for incorporation in ice cream, or in chocolate flavored drinks.

A product prepared according to the foregoing description and containing approximately 19 percent cocoa butter and 19.5 percent sugar has been found suitable for the purposes of the invention.

The term "fondant" as used in the art generally refers simply to a type of product obtained by subjecting a syrupy or sugar containing composition to a kneading operation (cf. Ency. Brit., 1955, vol. 6, p. 226). The term "fondantized" as herein used refers more specifically to the condition of a product resulting from subjecting a chocolate containing material to a conching operation for a period of time and under conditions of temperature sufficient to develop in the worked mass certain desired resultant flavor characteristics.

The following specific examples illustrate processes suitable in the practice of the invention:

*Example 1*

To 60 pounds of chocolate liquor prepared from beans that have been brought to a very low roast, there is added sugar in the amount of 40 pounds. The mixture is ground to a very smooth paste over conventional chocolate mass refiners. The mixture is then placed in a conch and worked therein for 24 hours at a temperature of 175° F. After the conching process has been completed, there is added to the above 100 pounds of product, 30 pounds of a full roast chocolate liquor, and 36 pounds of cocoa powder. After the latter has been incorporated, the mass is permitted to harden into cakes or slabs, and these are then crushed to the proper particle size for distribution to the trade.

*Example 2*

To 87 pounds of chocolate liquor, the beans for which have been brought to only a very low roast, there is added 13 pounds of sugar. These materials are refined over standard chocolate refiners, thereafter placed in a conch, and therein subjected to a conching operation for 18 hours, the temperature being maintained at 190° F. Following this conching operation, the mass is placed in a standard cocoa press and enough cocoa butter is extracted to bring the cocoa butter content down to a level of between 35 percent and 40 percent. The resultant cake then is crushed to a particle size suitable for introduction into ice cream mix.

*Example 3*

The procedure described in Example 2 is followed but in extracting the cocoa butter the content is reduced to a level of approximately 18 percent to 20 percent. Thereafter, the cake is pulverized and sifted in the manner customary for ordinary commercial chocolate powder.

What is claimed as my invention is:

1. A method of preparing a fondantized chocolate flavor composition for chocolate flavored ice cream which comprises the following steps; grinding to a smooth paste a mixture containing 13 to 40 parts by weight of sugar and 87 to 60 parts by weight of chocolate liquor prepared from cocoa beams which have been brought to only a low roast, subjecting said paste to a conching operation for 18 to 24 hours at a temperature within the range of 175° F. to 190° F., pressing the composition in a cocoa press to extract cocoa butter therefrom and to reduce the cocoa butter to a total content of 18 to 40 percent, and thereafter subjecting the pressed composition to a crushing and pulverizing action.

2. A method of preparing a fondantized chocolate flavor composition for chocolate flavored ice cream which comprises the following steps: grinding to a smooth paste a mixture containing 13 to 40 parts by weight of sugar and 87 to 60 parts by weight of chocolate liquor prepared from cocoa beams which have been brought to only a low roast, subjecting said paste to a conching operation for 18 to 24 hours at a temperature of 175° F. to 190° F. admixing therewith 30 parts by weight of full roast chocolate liquor and 36 parts by weight of cocoa powder, molding said mixture to the form of cakes or slabs and subjecting said molded product to a crushing and pulverizing action.

3. A method of preparing a fondantized chocolate flavor composition for chocolate flavored ice cream which comprises the following steps: grinding to a smooth paste a mixture containing 13 to 40 parts by weight of sugar and 87 to 60 parts by weight of chocolate liquor prepared from cocoa beans which have been brought to only a low roast, subjecting said paste to a conching operation for 18 to 24 hours at a temperature of 150° F. to 200° F., passing the composition in a cocoa press to extract cocoa butter therefrom and to reduce the cocoa butter to a total content of 20 to 35 percent, and thereafter subjecting the pressed composition to a crushing and pulverizing action.

4. A method of preparing a fondantized chocolate flavor composition for chocolate flavored ice cream which comprises the following steps: grinding to a smooth paste a mixture containing sugar and chocolate liquor prepared from cocoa beams which have been brought to only a low roast, subjecting said paste to a conching operation, admixing therewith an addition of full roast chocolate liquor and an addition of cocoa powder, molding said mixture to the form of cakes or slabs, and subjecting said molded product to a crushing and pulverizing action.

5. A method of preparing a fondantized chocolate flavor composition for chocolate flavored ice cream which comprises the following steps: grinding to a smooth paste a mixture containing sugar and chocolate liquor prepared from cocoa beams which have been brought to only a low roast; subjecting said paste to a conching operation at a temperature above approximately 150° F. and for a period long enough to produce a mellow fondantized chocolate flavor; and extracting most of the cocoa butter present in the paste.

6. A method of preparing a fondantized chocolate flavor composition for chocolate flavored ice cream which comprises the following steps: grinding to a smooth paste a mixture containing sugar and chocolate liquor prepared from cocoa beams which have been brought to only a low roast; subjecting said paste to a conching operation at a temperature above approximately 150° F. and for a period long enough to produce a mellow fondantized chocolate flavor; and admixing with the paste an addition of cocoa powder.

References Cited in the file of this patent

UNITED STATES PATENTS

| | | |
|---|---|---|
| 1,862,166 | Steely | June 7, 1932 |
| 2,278,471 | Musher | Apr. 7, 1942 |
| 2,328,791 | Drury | Sept. 7, 1943 |

UNITED STATES PATENT OFFICE
CERTIFICATION OF CORRECTION

Patent No. 2,969,286                      January 24, 1961

L. Russell Cook

It is hereby certified that error appears in the above numbered patent requiring correction and that the said Letters Patent should read as corrected below.

Column 3, line 48, for "beams" read -- beans --; column 4, line 11, for "passing" read -- pressing --; column 4, lines 20 and 31, for "beams", each occurrence, read -- beans --.

Signed and sealed this 13th day of June 1961.

(SEAL)
Attest:

ERNEST W. SWIDER                      DAVID L. LADD
Attesting Officer                       Commissioner of Patents